United States Patent
Klinefelter et al.

(10) Patent No.: US 10,499,168 B2
(45) Date of Patent: Dec. 3, 2019

(54) SYSTEM, METHOD, AND APPARATUS FOR PROVIDING INTERPRETIVE COMMUNICATION ON A NETWORK

(75) Inventors: Robert Glen Klinefelter, Long Beach, CA (US); Gregory A. Piccionelli, Westlake Village, CA (US)

(73) Assignee: KP Innovations, LLC, Carson City, NV (US)

( * ) Notice: Subject to any disclaimer, the term of this patent is extended or adjusted under 35 U.S.C. 154(b) by 852 days.

(21) Appl. No.: 12/658,496

(22) Filed: Feb. 8, 2010

(65) Prior Publication Data

US 2010/0198580 A1   Aug. 5, 2010

Related U.S. Application Data

(62) Division of application No. 10/057,131, filed on Oct. 25, 2001, now Pat. No. 7,792,676.

(60) Provisional application No. 60/243,162, filed on Oct. 25, 2000.

(51) Int. Cl.
*H04R 25/00* (2006.01)
*G06Q 10/10* (2012.01)
*H04L 29/06* (2006.01)

(52) U.S. Cl.
CPC ............ *H04R 25/70* (2013.01); *G06Q 10/10* (2013.01); *H04L 29/06027* (2013.01); *H04R 2225/55* (2013.01)

(58) Field of Classification Search
CPC .................................................... H04R 25/70
USPC .................. 379/52; 340/825.19; 704/271
See application file for complete search history.

(56) References Cited

U.S. PATENT DOCUMENTS

| | | | | |
|---|---|---|---|---|
| 5,109,509 A | * | 4/1992 | Katayama et al. | 704/9 |
| 5,304,895 A | * | 4/1994 | Ujihara | G09F 9/33 |
| | | | | 313/483 |
| 5,357,355 A | * | 10/1994 | Arai | 349/69 |
| 5,848,170 A | * | 12/1998 | Mahieux et al. | 381/92 |
| 5,884,247 A | * | 3/1999 | Christy | 704/7 |
| 5,917,944 A | * | 6/1999 | Wakisaka et al. | 382/190 |
| 5,926,787 A | * | 7/1999 | Bennett et al. | 704/235 |
| 5,983,073 A | * | 11/1999 | Ditzik | 455/11.1 |
| 5,991,719 A | * | 11/1999 | Yazaki et al. | 704/251 |
| 6,005,549 A | * | 12/1999 | Forest | 345/157 |
| 6,121,960 A | * | 9/2000 | Carroll et al. | 345/173 |

(Continued)

*Primary Examiner* — Michael N Opsasnick
(74) *Attorney, Agent, or Firm* — Gregory B. Gulliver

(57) ABSTRACT

Embodiments of the present invention comprises a system, method, and apparatus that provides for the utilization of a relatively real-time or near real-time interpretation or translation that may be utilized preferably for a relatively short duration of time on a network. A preferred embodiment of the present invention provides online, real-time, short-duration interpreting services in a network-based format. In preferred embodiments, the interpreting system comprises at least one provider computer, such as a server, wherein the provider computer is capable of communicating with user computers via a network. In one preferred embodiment, the provider computer provides a series of web pages that allow access to the interpreting system, including, but not limited to, a request for service page, wherein a user can access the system and input a request for interpreting services. Interpreting services are then provided to a user and a third party desiring to communicate with the user via the network.

21 Claims, 3 Drawing Sheets

(56) References Cited

U.S. PATENT DOCUMENTS

| | | | |
|---|---|---|---|
| 6,229,514 B1 * | 5/2001 | Larson | G02F 1/0147 345/101 |
| 6,240,392 B1 * | 5/2001 | Butnaru et al. | 704/271 |
| 6,259,491 B1 * | 7/2001 | Ekedahl et al. | 349/23 |
| 6,311,215 B1 * | 10/2001 | Bakshi et al. | 709/221 |
| 6,370,498 B1 * | 4/2002 | Flores et al. | 704/3 |
| 6,389,462 B1 * | 5/2002 | Cohen et al. | 709/218 |
| 6,396,805 B2 * | 5/2002 | Romrell | 370/216 |
| 6,421,425 B1 * | 7/2002 | Bossi et al. | 379/52 |
| 6,505,208 B1 * | 1/2003 | Kanevsky et al. | |
| 6,510,206 B2 * | 1/2003 | Engelke et al. | 379/52 |
| 6,574,599 B1 * | 6/2003 | Lim et al. | 704/270 |
| 6,583,770 B1 * | 6/2003 | Antila | G02F 1/1336 345/1.1 |
| 6,826,540 B1 * | 11/2004 | Plantec et al. | 705/7.32 |
| 7,024,363 B1 * | 4/2006 | Comerford et al. | 704/270 |

\* cited by examiner

SYSTEM, METHOD, AND APPARATUS FOR PROVIDING INTERPRETIVE COMMUNICATION ON A NETWORK

RELATED APPLICATIONS

This application is a Divisional of U.S. patent application Ser. No. 10/057,131, filed Aug. 25, 2001 (now U.S. Pat. No. 7,792,676), which claims the benefit of U.S. Provisional Patent Application Ser. No. 60/243,162, filed Oct. 25, 2000, each of which is incorporated herein by reference in its entirety.

FIELD OF THE INVENTION

The present invention relates generally to a system, method, and apparatus for providing real-time or near real-time interpreting services for utilization on a network. More specifically, embodiments of the invention relate to systems, methods, and apparatuses for facilitating communication for the hearing impaired or disabled in situations that are location-specific and in which the use of live interpreters is inconvenient or relatively neither cost nor time effective, wherein a real-time or near real-time interpreting service is provided, via a network.

BACKGROUND OF THE INVENTION

The system, known as Video Interpreting Program, has been offered by a well-established Maryland company, Sign Language Associates ("SLA"), since 1997. The system requires the use of a 3M™ VCS3100 video conferencing system and 3 ISDN phone lines. According to SLA the Video Interpreting Program™ has been used in medical, legal and general employment environments. The service is billed by the minute. At least one problem with this service is cost and efficiency of labor. In this system, the interpreters must be in a specific location for set periods of time, specifically, at a provider site possessing the specialized videoconferencing equipment. This is cost and labor inefficient as, more likely, interpreters will not be needed and utilized consistently, but will be required to be available at the equipment location, thereby, restricting their ability to provide services elsewhere.

In addition, voice recognition software has been developed. The Technology Assessment program ("TAP") of Gallaudet University, Washington D.C. (an internationally recognized education facility for the hearing impaired) is examining automatic speech recognition ("ASR") software, telecommunication relay services, captioning and wireless/cellular services. The current assessment of TAP is that voice recognition is making dramatic progress and while currently useable, does not suffer from "accuracy level, the problem of multiple voices and lack of clear speech" in terms of providing fully automated or live captioning. They do, however, note the ASR capabilities of Dragon Naturally Speaking and IBM Via Voice software.

In addition, TAP is actively promoting "video chat" to the hearing impaired utilizing Microsoft NetMeeting in conjunction with the ATI All-In-Wonder VGA card. However, such "video chat" is designed for use among the hearing impaired and does not address the problems associated with providing an interpreter in one of the above-described situations. TAP makes no reference to any commercial service seeking to use Internet video/audio as implemented by some of the various embodiments of the present invention.

Also, telephone utility companies and the cellular telecommunications industry provide an extensive service to facilitate communications by the hearing impaired, particularly through the use of TTY and TDD systems. To date, however, there has not been a cost effective system introduced to satisfy the need for remote visual exchanges between an interpreter, a non-hearing impaired person and a hearing disabled person. Moreover, to date, there is no indication that any service providers has moved to implement a video/audio system based on Internet connections as implemented by some of the various embodiments of the present invention Live interpreters are an integral part of communication for the hearing impaired and there is extensive network of these skilled professionals both nationally and globally. The Registry of Interpreters for the Deaf, founded in 1964, provides a national organizational structure, professional association and certification process for these interpreters and transliterators. It also embraces international membership. Although live interpreting is advantageous, it fails to resolve the basic problems presented herein, namely, providing an interpreter in a timely and cost efficient manner for various situations, such as, those, which arise in medical emergency rooms and police stations. Live interpreting is, therefore, not seen as direct competition for the embodiments of the present invention. Various embodiments of the present invention may be utilized to fill a market gap—namely that of short-duration location-specific interpreting where both cost and time factors preclude the use of live interpreters.

For example, in a hospital, it may take two hours or more to locate and transport a translator or interpreter to the medical facility so that the person may provide interpretation and translation, to, for example, a hearing impaired patient or family member of a patient. Thus, the so-called golden hour is lost, because it takes, in this example, over twice as long just to begin questioning the patient in preparation for treatment. In a more typical conventional situation, at least a part of the golden hour may have been lost in transporting a patient to the hospital in preparation for treatment. Thus, the wait for a translator or interpreter to help either the patient or a family member becomes more imperative that it occurs quickly. For example, if only 10 minutes of the golden hour is left that only allows for 10 minutes to track down and transporting the translator or interpreter or any other needed third parties to the hospital emergency room. This is often proven difficult if not impossible to accomplish in this time frame.

In another scenario, as discussed above, a live interpreter might be located and provided via a teleconference system that may be set up, for example at an office specialty service provider, e.g., a Kinkos®. Unfortunately, having the interpreter being viewed at the local office specialty store rather than at the hospital really provides little, if any, ability to treat the patient or consult family members in an effective manner. Further, most hospitals do not have a significant telecommunications equipment for providing video conferencing at their facilities. However, for the hospitals that do have this equipment it is often located far away from the emergency room area and is considerably bulky and difficult, if not relatively impossible, to move from room to room. Thus, this solution of utilizing a hospital's teleconferencing equipment is also considered a failure to solve the above mentioned problems, such as medical facility interpretation, as the videoconference presentation of the interpreter is not in a useful location relative to the emergency room for the patient or the family that may be able to advise medical personnel in the treatment of the patient.

In addition, to the inconvenience of the location of the necessary teleconferencing equipment, the cost is relatively high for the utilization of the equipment even if it is attempted to be used. For example, teleconferencing equipment typically requires 3 ISDN lines to be able to receive an image on the teleconferencing equipment that provides the resolution and frame speed requisite to enable parties to the conference to be able to understand what an interpreter or translator is "saying." This is because the translator/interpreter is utilizing sign language that requires a visual perception of the translator on the teleconferencing equipment display. When the display and/or the speed in real-time appearance of the display is not adequate to see distinct precise and specific movements of the interpreter or translator, then the communication is degraded and often becomes a complete failure in any attempt to communicate with the receiver of the display of the telecommunications equipment. The receiver may, for example, be the patient or a family member of the patient in the hospital.

A need in the industry exists for a system, method and apparatus that provides an ability to locate and utilize an interpreter and/or translator quickly, for example, in real-time or in relatively near time, without having to maintain or provide a translator or interpreter to be constantly attending and personally present at a specific location of the user of the interpretation or translation services or efforts. Further, a need also exists for a system, method and apparatus that provides for utilization of these interpretive and/or translative providers via a network, for example the World Wide Web. Still further, a need also exists for a system, method and apparatus that provides for a multi-lingual interpretive or translative option that is available anywhere in the world in real-time or near real-time.

Finally, a need exists for a system, method and apparatus for utilizing an interpretive and/or translative ability anywhere in the world by at least one of a user, recipient, and/or at least one third party that may also utilize a network, such as the World Wide Web, if desired in a relatively real-time or in near real-time utilization.

SUMMARY OF THE DISCLOSURE

Embodiments of the present invention are best understood by examining the detailed description with reference to the drawings. However, a brief summary of the disclosure follows.

Embodiments of the present invention comprises a system, method, and apparatus that provides for the utilization of a relatively real-time or near real-time interpretation or translation that may be utilized preferably for a relatively short duration of time, that is also preferably utilized with a network. A preferred embodiment of the present invention provides online, real-time, short-duration interpreting services in a network-based format. The service focuses directly on facilitating communication for the hearing disabled in situations which are highly location-specific and in which the use of live interpreters is neither cost nor time-effective or is otherwise inconvenient.

The interpreting system comprises at least one provider computer, such as a server. The provider computer is capable of communicating with user computers via a network. In one preferred embodiment, the provider computer provides a series of web pages that allow access to the interpreting system, including, but not limited to, a request for service page, wherein a user can access the system and input a request for interpreting services.

In preferred embodiments, the user, such as, a hospital, accesses the interpreting system via a user computer, wherein the user computer is connected to a network. As discussed above, the interpreting system is accessed via a provider computer, wherein the user computer and the provider computer communicate via the network.

Once the user accesses the interpreting system, the user provides information directed to the interpreting needs. This information includes, but is not limited to, time restrictions (when the service is needed), subject matter of interpretation, anticipated length of service, age of hearing impaired person, and contact information.

Upon receipt of the request for services, the interpreting service sends out a request to all available interpreters. Any available and qualified interpreter that is qualified for the type of interpretation required, accesses the interpreting system and identifies himself or herself as available. An interpreter is then chosen. The chosen interpreter contacts the user via the network and performs the required services.

In a preferred embodiment of the present invention, the user, such as a hearing impaired person or third party, does not pay the interpreter directly, but rather, pays, for example, a monthly fee. In some preferred embodiments, the user pay a monthly fee for either a limited or unlimited amount of access and use of the interpreting system. Further, an entity, for example, a hospital may pay a monthly fee for the right to utilize the interpreting system in treatment of its patients and communication with others that may assist the hospital in treatment of its patients.

In addition to monthly fees, in alternative embodiments, the user can pay based upon a variety of factors, including, but not limited to, a per session fee, a per translation fee, a fee based on the number of words or data translated per use, the type of interpretation provided, the quality and/or certification of the interpreter, the relative cost of the linking of various parties and interpreters to the network, the availability and time of day, and whether a preference was indicated by the user for a particular translator or qualification of translator, and the physical location of the interpreter or other parties to the session. Alternatively, the user may also pay based upon the cost of the transmission links, or a percentage of the cost of either a portion or all of the translation and/or interpretation direct or indirect costs. Also, the fee may be based upon a licensing or other type of intellectual property payment scheme such as a per translation or per transaction or session cost or based upon the percentage of time utilized for translation versus other portions of the communication session and/or any other method or allocation or charge or costs that the user may so desire and/or the provider may wish to provide.

BRIEF DESCRIPTION OF THE DRAWINGS

Embodiments of the present invention are described in detail herein with reference to the drawing in which.

Figure 1:
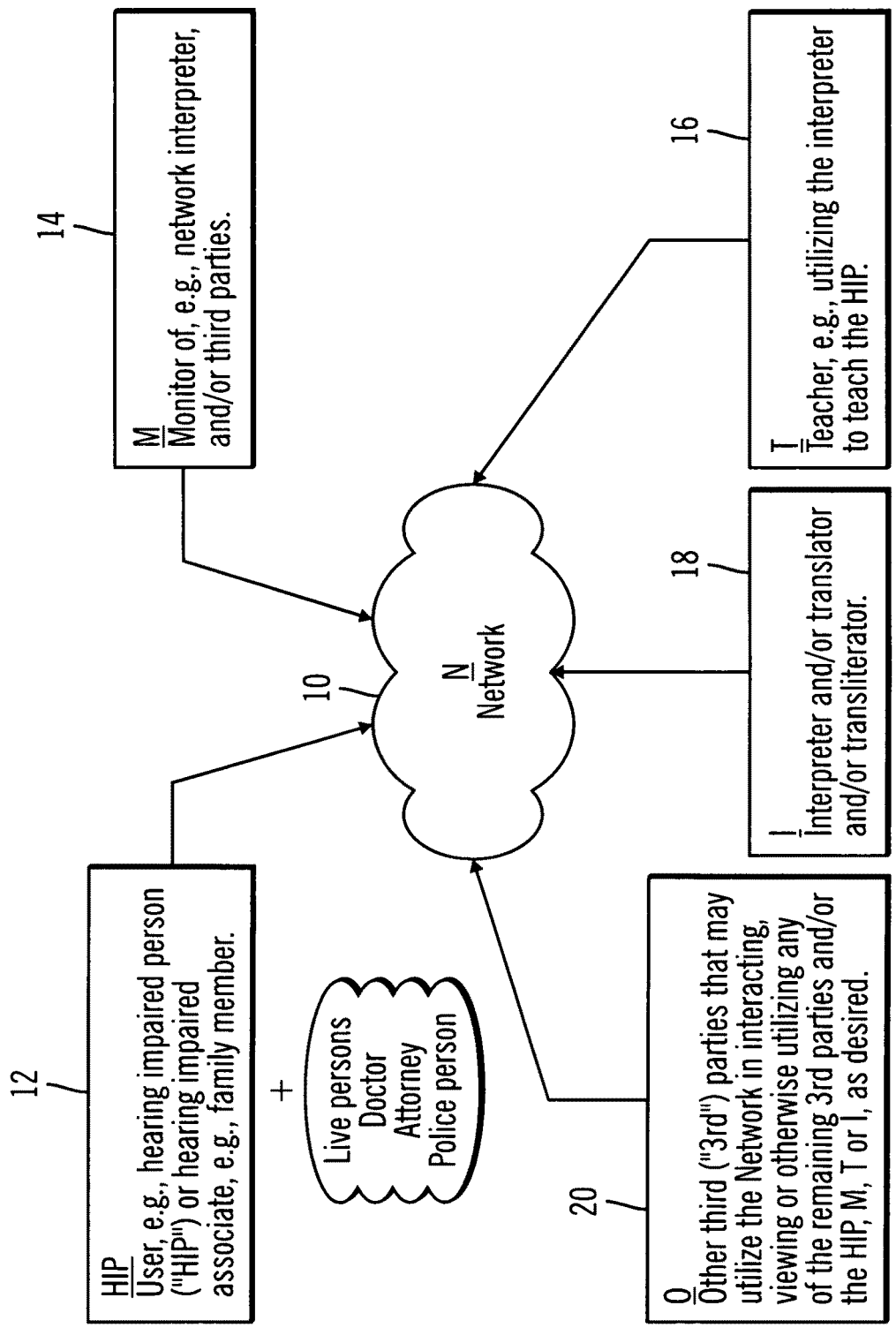
FIG. 1 illustrates a portion of a first embodiment of a virtual Internet drive method and device, in accordance with the principles of an embodiment of the present invention.

The accompanying drawing, wherein like numerals denote like elements, are incorporated into and constitute a part of the specification, and illustrate presently preferred exemplary embodiments of the invention. However, it is understood that the drawing is for the purpose of illustration only, and is not intended as a definition of the limits of the invention. Thus, the drawing, together with the general description given above, the detailed description of the preferred embodiments given below serves to explain the principles of the invention.

DETAILED DESCRIPTION OF THE PREFERRED EMBODIMENTS

An embodiment of the present invention is illustrated utilizing functional flow charts as illustrated in FIG. 1. The present invention may be implemented on any computer that has access to a network, e.g., the World Wide Web, as well as hand-held devices such as personal communication devices, including, but not limited to portable telephones, personal appointment managers, a Palm Pilot, and other Internet access devices such as Web TV. A network access itself may be achieved by radio frequency link, telephone modem, cable modem, high-speed DSL, wireless connection or any other network communication technique conventionally available.

As the World Wide Web access is improved, such that the speeds between the user and the World Wide Web are increased so that the user may download and upload data more quickly, the user may continue to enjoy an ever-increasing benefit from the utilization of various embodiments of the present invention, as compared to conventional techniques.

Preferred embodiments of the present invention are directed to a system, method, and apparatus for providing relatively real-time or near real-time interpretation, wherein the need for interpretation is a relatively short amount of time. In preferred embodiments, the interpretive system is provided via a network. For example, in one embodiment, communication may be facilitated for the hearing disabled in situations that are highly location specific, such as, a hospital, police station, car rental counter, or retail store in which the utilization of live interpreters is neither cost nor time-effective.

In preferred embodiments, the interpreting system comprises at least one provider computer, such as a server. The provider computer is capable of communicating with user computers via a network. In one preferred embodiment, the provider computer providers one or a series of web pages that allows access to the interpreting system, including, but not limited to, a request for service page, wherein a user can access the system and input a request for interpreting services.

The provider computer is accessible to a plurality of interpreters via individual computers capable of communicating with a network, or any other means of accessing the network, such as a palm pilot, upon which interpreting services may be displayed in real time or near real time. A subset of the plurality of interpreters make themselves available via the network, or any other communications means, such as a telephone, pursuant to a predefined schedule. In preferred embodiments, an interpreter is available throughout the network, regardless of user geographical location, 24 hours a day, 7 days a week. In preferred embodiments, an interpreter may become available to the system not pursuant to a predefined schedule, but at the time or times the interpreter desires to make his or her services available via the network.

In preferred embodiments, the user, such as, a physician or aide in a hospital, accesses the interpreting system via a user computer, wherein the user computer is connected to a network. As discussed above, the interpreting system is accessed via a provider computer, wherein the user computer and the provider computer communicate via the network.

Once the user accesses the interpreting system, the user accesses the interpreting service's request web page, customer service or scheduling department, or other appropriate live or digital representative of the interpreting service and provides information directed to the interpreting needs required. In some preferred embodiments, the user may request the first available interpreter. In other preferred embodiments, the user may provide a plurality of other specific requests and other data to assist in matching the user's interpretation requirements. This information includes, but is not limited to, time restrictions for the providing of the service (when the service is needed), acceptable price or price range of interpreter, the requirement of acceptance of the user's insurance to cover all or part of the services to be provided, subject matter specialty of interpretation (legal, medical, diplomatic and/or technical areas), legal or organizational certification of interpreter, one or more specific foreign languages required for interpretation, anticipated length of service required, preferred gender of interpreter, age of hearing impaired person (e.g., if a child communication specialist is required), parental consent (if hearing impaired person is a minor) geographic proximity of the interpreter to the user, previous evaluations, ratings or recommendations of the interpreter, previous use of the interpreter by the user, request for a particular interpreter, request to include advertising, request to exclude advertising, and other criteria, and user contact and payment information, including promotional participation data. In some preferred embodiments, the user fills in a series of data boxes online to transmit the aforementioned data. In still other preferred embodiments, the user is provided with a pull-down menu that allows for users to choose from a variety of predefined menu options, wherein the options define the type of service request desired. Once the user has filled in the request page, or otherwise provided information regarding the type of service requested, the user submits and transmits the information to the provider computer, representative person, department or digital agent. In some preferred embodiments, the aforementioned request is performed telephonically. In still other preferred embodiments the aforementioned request is performed via audiovideophonic communication. In still other preferred embodiments the aforementioned request is directed to providing an interpreter which may be geographically proximate to the user so as to enable the interpreter to effectively translocate to the place where interpretation services are needed for further or extended on site interpretation services. In still further preferred embodiments, the request is directed to an interpreter capable of providing interpreting services en route to the location of the user as by mobile wireless connection to a network.

Upon receipt of the request for services, the interpreting service matches the criteria for the interpreter requested and effectuates an audiovideographic connection between the interpreter and the user. In preferred embodiments, the interpreting service transmits a request to all available interpreters. Any available and qualified interpreter, that is, qualified for the type of interpretation required, accesses the interpreting system if not on-line, and identifies themselves as available. An interpreter is then chosen. The chosen interpreter contacts the user via the network and performs the required services. In other preferred embodiments, the interpreting service effectuates a connection between an "on call" or predesignated interpreter and the user requesting the services.

The above-described system is capable of being used in virtually any type of institution, retail establishment, organization or individual home. Indeed, in some instances, some of the hardware already exists. For instance, healthcare institutions already possess good computer facilities located in service transaction areas such as emergency rooms and outpatient clinics. Thus, unlike existing video conferencing services, no new equipment is required for at least some of the embodiments of the present invention. Moreover, healthcare facilities are already familiar with the use of Web-based technology to enable remote consultations such as radiology. Thus, no substantial behavior modification is required of the customer.

A preferred embodiment may be utilized on similar public sector and commercial institutions that meet similar market criteria: the requirement to meet the ADA "reasonable accommodation" standard, have existing computer facilities located in or adjacent to public interface or service areas. This may, e.g., include Police and Paramedic agencies, Social Security, Immigration, Police, Courts, and Department of Motor Vehicles as well as commercial applications such as airports, rental car companies, amusement parks, banks and department stores. Similarly, the educational market offers downstream potential with continued development of automatic voice recognition captioning for longer duration simultaneous translation.

Yet another embodiment may be utilized for individual home subscribers. This would permit hearing disabled individuals to facilitate communication with family, friends and other contacts thereby enhancing their quality of life. In addition, it would enable these subscribers to undertake regular calls and daily contacts with emergency services, doctors, utility companies, etc.

In some preferred embodiments of the invention, third party vendors of goods and services utilize the interpretation services to provide sign language advertisements, introductions, information and education regarding their goods and services to the aforementioned subscribers. In still further embodiments, fourth party agents and affiliates may use the interpreting system to perform such advertising, introduction, information and education services in exchange for consideration, including, a fee for any goods or services purchased by the user.

Yet another embodiment may be utilized, that incorporates global application for its hearing impaired interpreting concept with flow-on implementation to offer multilingual, foreign language interpreting for its core customer base.

The online, real-time interpreting service developed in various exemplary embodiments for the hearing disabled directly targets this market by taking advantage of a clearly identified need, an established legislative imperative in the form of the Americans With Disabilities Act and the emerging technology which now allows networked real-time imaging via the Internet. As outlined in the following section, preferred embodiments that may provide healthcare and education sectors with rapid expansion envisaged into those areas of commerce which involve substantial person-to-person interface such as amusement parks; airports—including information booths, ticket counters, customs and immigration facilities; rental car companies; and major shopping malls. It is noted that the existing Internal Revenue Code (Title 26, Section 190) allows tax deductions of up to $15,000 annually for the removal of barriers to people with disabilities.

Hearing impairment is not a disability peculiar to the United States and hence the opportunity exists to establish yet other arrangements of the present invention on a global basis through a multinational network of qualified interpreters linked by the Internet or other wide are computer networks. Preferred embodiments of the present invention are capable of operating on a global basis through a multinational network of qualified interpreters linked by one or more common networks. In some preferred embodiments, the interpreting system provides real-time simultaneous language translation in a location-specific manner worldwide. The service for hearing impaired is in itself a significant, however, the possibility of simultaneous language translation via the Internet or other wide area networks, can provide the facilitation of communication in a wide array of services and situations.

In the travel industry this "point-of-sale" service may be utilized by airlines, rental car operations, hotels, cruise operators and the like. It has direct application for point-of-entry interpreting for immigration desks, customs officials and transport operators. In the education sector it suggests the possibility of online education beamed globally yet available simultaneously in a number of different language translations. In business it has future potential for allowing global executives to utilize their own, trusted sources for interpreting and avoids the necessity to rely on host country interpreters who may be unfamiliar with the technical terms being used, unfamiliar with the business or negotiating style of the executive and who may pose a significant industrial espionage threat.

Preferred embodiments of the present invention may be implemented in a rapid, albeit preferably sequenced, expansion into this area based on the establishment of a global exchange linking established interpreting and translation services world wide in a real-time online network.

Preferred embodiments provide an online real-time short duration location specific interpreting service geared initially to the needs of the hearing disabled in the United States but with subsequent second stage expansion to enable coverage of key global markets. It is envisaged that the third stage of expansion would move beyond the hearing impaired to embrace real-time simultaneous language translation in a multilingual and multinational-networked format. The service will be capable of operating on both a point-to-point and a multi-conferencing basis as necessary. The integrated use of voice recognition is planned for ongoing development and implementation of the service.

At present, the hearing needs of the hearing disabled are catered for by the use of such instruments as assistive hearing devices, paging devices, telephonic devices including TTY and TDD, pictograms and both sign language and oral interpreters. All these instruments ameliorate the barriers faced by the hearing disabled. Moreover, all these instruments are classified under the Americans With Disabilities Act as "auxiliary aids and devices" recognized as meeting the "reasonable accommodation" prescription of the Act. However, in certain key circumstances these "aids and devices" have significant drawbacks. For example, the provision of qualified sign language or oral interpreters must often be arranged up to two weeks in advance and in emergency or life threatening situations there can be both unacceptable delay and excessive cost in obtaining interpreters.

In one preferred embodiment, the present invention provides for the introduction of an online exchange linking a network of qualified sign language interpreters, oral interpreters, simultaneous transcribers and, where appropriate, voice or motion recognition captioning. The exchange would utilize current Internet and wide area computer network technologies allowing live audio and video feeds.

Arrangements of the present invention may also be utilized or, e.g., integrated with, e.g., Real Networks, CUSeeMe, Net Meeting and other software solutions that facilitate worldwide video and audio communication and data collaboration across the Internet. In addition, the potential use of the emerging Bluetooth chip technology would allow remote wireless communication in local networks, for example within emergency rooms and hospital wards, thus allowing mobility on the part of the user such as required by an emergency room physician in an examination room. These are situations where short-term interpreting is required (short-term generally being of periods less than approximately 30 minutes but may be even less, e.g., 25, 20, 15, 10, 5, or even less than 1-5 minutes in a location-specific or transaction-specific environment and for which the use of a physically present interpreter is neither cost nor time effective.

Figure 2:
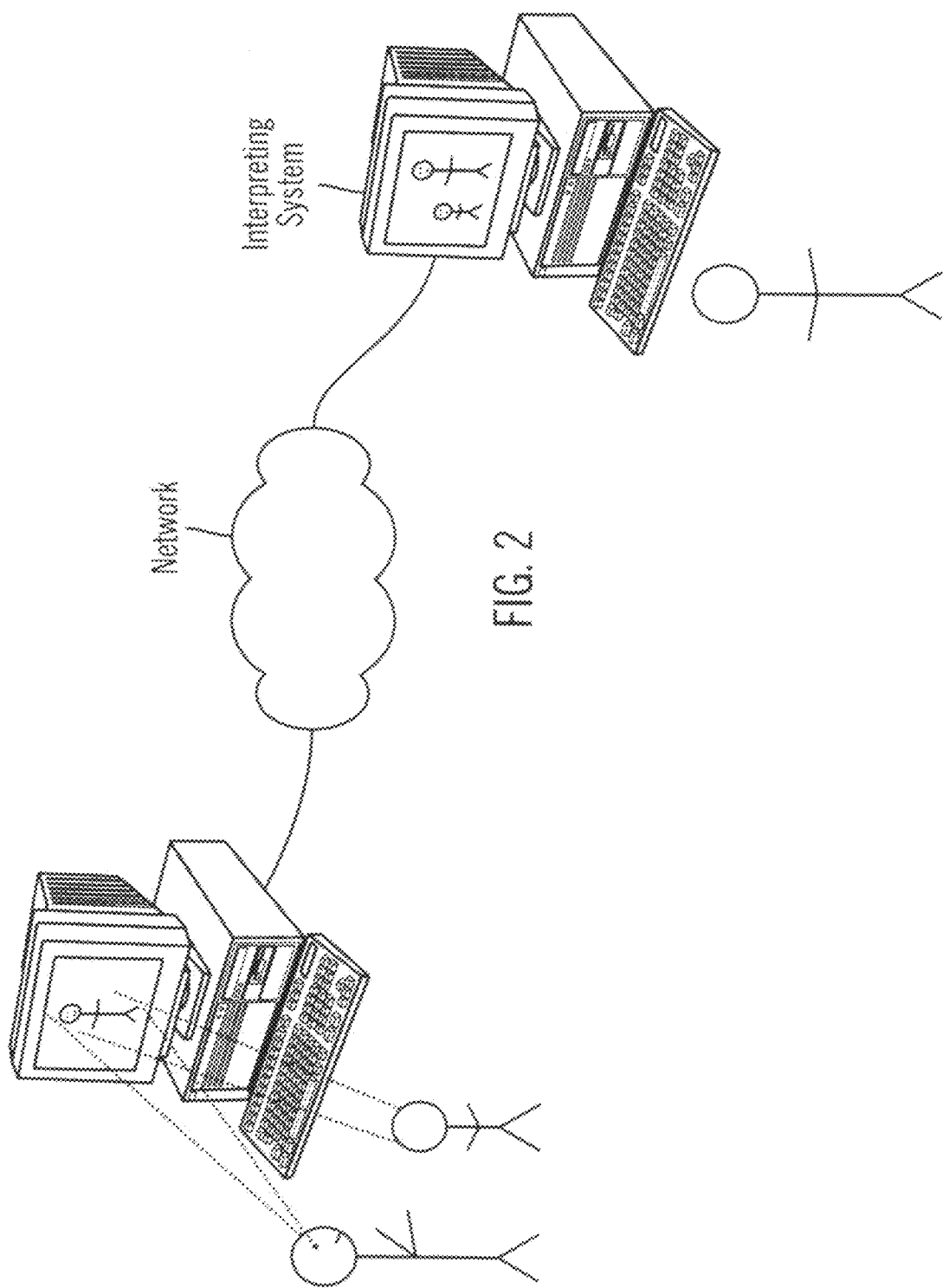
FIG. 2 depicts a preferred embodiment of the present invention during use.

In reference to a preferred embodiment in FIG. 2, the network could operate as follows in, for example, the case of an emergency room physician treating a hearing disabled patient:

Utilizing a PDA, laptop, Internet-capable cellular phone, or similar handheld device, capable of receiving, displaying and broadcasting the remote sign language or foreign language interpreter's signing and vocal communications, such as by flat screen monitor and speaker, and capturing and transmitting the hearing impaired person's signing, and the physician's voice, such as by camera and microphone devices, the physician would log on to the network via the hospital interne service connection;

The present invention's menu would provide a choice of icons for interpreting services, e.g., labeled in both script and pictogram;

The physician user would choose the type of service, price, interpreter qualifications, time to commence the services, and any other user selectable request criteria;

A user, e.g., a physician would click to the required icon for connection;

Service would search the network and connect to the first available interpreter;

Audio and video connection would be established and interpretation would then begin utilizing voice communication between the physician and the interpreter and sign language between the sign language speaking hearing impaired patient;

As necessary, required or requested, communications by one or more of the parties can be made available in scrolled text on the screen generated by real time stenographic or voice recognition means.

The interpreting transaction would be recorded in file format for playback as necessary for checking accuracy or in the event of liability or dispute.

In some preferred embodiments, the user of the service is a subscriber to the service wherein access to the service is password protected. In some preferred embodiments, the user pays a monthly service fee to have access to interpreters and, pays a fee to the interpreting service for actual use of the interpreter on a fee for time basis. In some preferred embodiments, the user pays for the services on an "as needed" basis wherein access to the service is preceded by the presentation, authorization and acceptance of a credit card, debit card, digitally signed contract or other payment means.

In some preferred embodiments, the interpreter(s) is (are) directly paid for all or some of sums due to the interpreter(s) by the aforementioned "as needed" payment is made by the user. The exchange would link participating sign language or oral interpreters regardless of the interpreter's physical location. In preferred embodiments, interpreters would be available on a twenty-four hour basis for all users, wherever located, despite the potential time zone differentials that may arise.

In some preferred embodiments, participating interpreters would be required to meet specified participation criteria, such as certification from the appropriate U.S. certifying body or bodies (e.g. Registry for Interpreters for the Deaf). Membership of the exchange would be subject to a controlled application process and would entail, e.g., an annual membership fee. In addition, participating interpreters must have access to computer equipment meeting predefined specifications or be required to lease such equipment from the provider or utilizer. Each participating interpreter would be required to carry a specified level of public liability insurance over and above that carried by provider or utilizer.

In preferred embodiments of the invention, look-up and verification of a selected interpreter's insurance status (e.g., to determine if the required policy is valid and in force) by access to an appropriate insurance data base or by other means, may precede the connection of the user with the interpreter, and if the results of such look-up reveals that the interpreter is uninsured, underinsured or that there is some other liability concern, the interpreter could be then made unavailable for to provide the requested services.

A provider or utilizer portal may be located with an existing major service provider, who will be offered exclusive rights to host the service for a fixed contract period. This provider will be given first right of refusal for the subsequent envisaged expansion of the provider or utilizer platform, i.e. the second stage development into providing hearing impaired coverage for selected global markets followed by a third stage expansion into providing simultaneous translation on a multilingual and multinational basis.

Targeted institutions will be offered a service subscriber package entailing an annual subscription rate covering a guaranteed amount of time on the service per month. In the manner of telephone calling cards subscribers will be able to "top up" their monthly subscriber time allocation should they appear close to exceeding their normal subscription rate. Member institutions will be designated as "The Provider or Utilizer Service Members" and their contact details circulated in directory form to the hearing disabled across the United States. Signs bearing the provider or utilizer logo will be supplied to member institutions for display in public areas thus promoting the institution's use of the provider or utilizer Service. In addition health insurers will be encouraged to provide priority coverage for insured health impaired patients to seek treatment at "Provider or Utilizer Service Member" institutions and clinics.

The provider or utilizer may also enable, because of the above, create a large secondary market for hearing disabled individuals to seek personal subscriptions to The Provider or Utilizer Service. Such individuals would be able to log into the service from a home or office computer and utilize the video service to communicate freely with friends, relatives and business associates. In addition, personal subscribers can use the interpreting service to facilitate the regular telephone calls and daily contacts that the hearing enabled take for granted. This would include emergency calls, calls to healthcare professionals to seek appointments or prescription refills, calls to government agencies such as IRS and Social Security, calls to utility companies and calls to taxi services, airlines and the like. Again personal subscribers would purchase a monthly access package with the capability to "top up" on a month-to-month basis should their circumstances so demand. The ability for hearing impaired individuals to have access to such a service not only offers considerable potential to improve their quality of life but also offers a vehicle for increased independence and personal confidence.

As previously described, the substantial number of Americans classified as having chronic hearing impairment, an estimated 23,000,000 in the year 2000. This represents a substantive market for a wide range of goods and services that can be exclusively promoted to this target audience via the personal subscription to the Provider or Utilizer Service. Access to this market (a market that is in large part unreachable by existing vehicles such as telemarketing, radio and television that rely on audio delivery) via the use of the Provider or Utilizer Service enables third party vendors to use preferred embodiments of the instant invention to provide a useful promotional vehicle for a large number of goods and services.

In turn, the establishment of a core membership of subscriber healthcare institutions then provides the platform for expansion of the service to other institutional target sectors who—like the healthcare industry—are subject to the "reasonable accommodation" standard of the Americans with Disabilities Act, have high levels of public interface and who have existing computer facilities (preferably with broadband access) already located in or adjacent to public interface areas such as service desks. Such targets will include government agencies such as Social Security offices, Immigration & Naturalization Service, Public Housing agencies, Courts, Police Departments, Department of Motor Vehicles and Inland Revenue Service. Flow-on target subscribers that meet the above criteria would then include more commercial applications such as airport information desks, airline lounges, rental car companies, hotels, amusement parks, supermarkets, drug stores and department stores. Again, all these target sectors have a requirement for short duration interpreting of customer interactions taking place at the point of service transaction. These are all situations where, in the absence of a services such as the Provider or U preferably offers, there is considerable potential for confusion, frustration, discrimination and the inevitable deterioration of customer service. In addition, with a potential target audience amounting to some 8% of the American population there is a clear commercial incentive for such private sector outlets to become subscribers and to be aggressively promoted to the hearing disabled as offering this service—particularly in view of the tax credits which apply (see Appendix 1).

Similarly, the educational market is seen as a substantial market opportunity, particularly in association with online education providers or in classrooms offering a standardized, repeatable lesson format, e.g., technical training where the need is not for short duration, time sensitive interpretation but can be delivered in a prepackaged, repeatable format thus offsetting the current cost of delivering real-time interpreting. Real-time interpreting of, for example, a 3 to 4 hour graduate class would be prohibitively expensive for most educational facilities. However, educational facilities increasingly have high levels of computer technology installed or available for in-class access by students. Also, the provider or utilizer may also incorporate or utilize voice recognition, so that it will be able to offer in the short-term a future a cost-effective closed captioning service via the Internet or wireless device that would enable hearing impaired students to effectively and unobtrusively participate in the class utilizing a voice recognition caption stream on the student's laptop device.

In a business method arrangement of various embodiments of the above-described invention, a subscription may be utilized. Thus, a fee may be paid, for example, at a regularly set time, for example, every month in order to be provided with and/or utilized and/or obtain translation and/or interpretation up to a certain time limit or may even be unlimited depending upon the subscription price. This would particularly be beneficial too, for example, police departments, hospitals and the like and other community service organizations because this would provide for essentially a fixed fee amount that can be more readily budgeted by these organizations and thus provide a more cost effective and cost conscious provision of services for the hearing impaired by these organizations. Further, it will allow these organizations to more accurately predict their budgets so that they may provide the best utilization of their often limited funds for services including providing for access to at least some of the various arrangements and embodiments that comprise the present invention.

In yet another alternate embodiment of the present invention, a portion or all of the translation or interpretation including but not limited to any of the arrangements that are described below with reference to FIG. 1, there may also be provided with a reduced fee or even a free Internet service provider account such as a free DSL account. Alternatively, and/or in conjunction with the free DSL account, other arrangements and preferred embodiments of the present invention may be provided with a type of advertising such as Web-based banner, audio, visual, audiovideo and/or multimedia "commercials" or other advertising or surveys that may be presented and/or interacted with by the user and/or interpreter(s) at any time before, during and/or after the translation or interpretation is being provided. In other preferred embodiments, such advertisements may alternatively be implemented so that said advertisements are displayed when there is, for example, silence for a certain amount of time or the user indicates that it is a non-critical communication and that information such as advertisements may be allowed in addition to the translation and/or interpretation being utilized. In still other preferred embodiments, such advertising may exist in a user opt-in or opt-out configuration. In still other preferred embodiments, the presence or absence of such advertising may be associated with increases or decreases in the price to the user for providing the interpreting services and/or the payment to the interpreter(s) for providing the interpretation or translation service.

The various arrangements and embodiments of the present invention may also be utilized with the above and/or with a provision for a relatively reduced fee and/or free long distance communication configuration or enablement option for the user, for example, by utilizing the World Wide Web to transmit other types of communications such as voice while also utilizing the translation and/or interpretation for a hearing impaired person.

In yet other alternate arrangements and embodiments of the present invention, the system, method and apparatus may engage interpreters that are transported in person to a specified location, for example, a police station or hospital emergency room, or in a preferred arrangement, by providing the interpretation or translation to the subscriber and/or to the user or any other third party via a network, for example, the World Wide Web en route to the specified location.

In yet other alternate arrangements and embodiments of the present invention, the above subscription business method may be utilized with present interpreters that show up or are transported in person to the various locations where such services are requested, for example, police stations or hospital emergency rooms, or in a preferred arrangement by providing the interpretation or translation personnel to the subscriber and/or to the user or any other third party via a network, for example, the World Wide Web.

In the various alternate arrangements and embodiments that utilize as a portion of the communications network, there are many further arrangements and embodiments that may be understood in the practice of this invention. First, for example, a subscriber or utilizer may utilize the network to connect with a boiler room of interpreters that are on standby and ready to immediately interpret for a subscriber when contacted. Alternately, the interpreter or a number of interpreters may be, for example, home based or offsite location-based and may be utilized as an overflow to the boiler room or vice versa where the preferred interpreter is home based and the overflow of requests, when the supply of home based interpreters is exceed is handled by a boiler room of interpreters. Of course, an essentially boiler room may be created by linking a plurality of home based or other offsite based interpreters. In preferred embodiments of the invention dynamic allocation of interpreters on the basis of availability and demand is accomplished either automatically by the service's network software or by one or more human dispatchers.

In yet another alternate arrangement of the present invention, the interpreters may instead be located by the subscriber or a third party by utilizing a wireless technology, for example, a mobile phone that indicates to the interpreter to contact through preferably a specific website address the subscriber and begin interpretation. Interpretation may be provided visually, for example, by utilizing the mobile phone in connection with a laptop and a small CCD camera mounted with a laptop or separately so that the interpreter may immediately provide services anywhere in the world. In addition, the interpreter may also at the same time obtain or be automatically provided transportation, for example, by the hospital or via other third parties or by the interpreter themselves hailing a taxi, for example, and being transported while continuing to interpret in a wireless embodiment of the present invention.

In yet other alternate arrangements of the present invention and particularly in a plurality of preferred arrangements that utilize a wireless portion may thus provide worldwide coverage. Also, multi-lingual coverage may be provided, for example, a Spanish speaking hearing impaired person may utilize a Spanish speaking interpreter that is actually located in Spain when there are no Spanish interpreters remaining more near by relative to the hearing impaired person. Or vice versa, the Spanish speaking hearing impaired person may actually be in Spain and wish to utilize a specific facility such as a renowned hospital and an interpreter that speaks both English and Spanish that may, for example, reside in the USA and thus obtain the desired translation and interpretation by utilizing yet another arrangement of the present invention preferably in a network environment.

In yet other alternate arrangements of the present invention, the linkage between, for example, the interpreter and the hearing impaired person may be predetermined or may be implemented in real-time depending upon input from any one of the interpreter, the hearing impaired person, and/or any other third party or a combination thereof. Thus, in one exemplary embodiment of the present invention, the hearing impaired person may indicate a preference for a specific interpreter such as one that has been utilized previously by the same person and the hearing impaired person wishes to utilize the same interpreter again. The routing between the parties may also be accomplished by other at least partially predetermined and/or real-time decisions based upon software algorithms that include choosing the routing based upon the physical location of the interpreter, the hearing impaired person, and/or any other third party, on the previously described preference of one or more of the parties, based upon the cost of interpretation and/or connection, based upon the availability of any one of the parties involved, and/or based upon the skill level, and/or whether or not the interpreter is state and/or government approved or certified and the like.

Further, other changes to the routing may include rating and/or acknowledgment of any specialized knowledge on a specific subject that the interpreter or any other third parties have or a rating based upon past performance may also be utilized or incorporated with the other factors in deciding the routing to be utilized. Again, this selection may be via a predetermined algorithm, a third party that is monitoring and/or even arbitrarily deciding the routing between the hearing impaired person and any other party, and/or may be determined solely by any one of parties including the hearing impaired person themselves.

In a business method application of various embodiments of the present invention, there may be a cost difference to the user and/or any other third party depending upon the skill level and/or experience in communicating that the interpreter has. Also, a menu may be provided to any of the connected parties, for example, the interpreter, the hearing impaired person, and/or any other third party that may be utilized to select or indicate a preference, for example, a certified or licensed interpreter and/or any of the other above-mentioned preferences as desired. Depending upon these choices may indicate an instantaneous change in cost in real-time or near real-time for the continuing interpretation being provided. Thus, as a higher skill level is desired a different interpreter may be provided, for example, for a few minutes and then the hearing impaired person may shift back to a first or even a third interpreter that is provided a lower rate, for example, in more calm family discussions as opposed to when a higher priced interpreter may be desired that may be familiar, for example, with complex medical terminology and the like in evaluating treatment with a doctor.

Other arrangements for providing a charge include a charge or fee by subscription, for example, a fixed cost per month, or maybe utilized with a Visa or MasterCard or other credit card that preferably utilizes a chip in the card so that a more informed knowledge of any of the connected parties maybe instantly ascertained, at least in part, by utilizing information contained in the chip on the charge card or other identity or informational card being utilized in connection with the various embodiments of the present invention.

Yet other embodiments may utilize a fixed fee for a base number of minutes or time period amount or have a cost associated with the excess units of time that are utilized. For example, charging an extra $2.00 a minute for any utilization over 30 minutes a month. Other cost ranges may include, for example, other services that may be provided along with the visual interpretation, such as, a real-time transcript or a transcript that is provided at a later date, a video tape, and/or audio that may be analog or digitally or any other technique as is known in the art to record and preserve the interpretation activity.

Thus, various embodiments of the present invention may also be utilized to generate live or real-time transcripts, as well as a recordation of any or all of the communications and/or interactions of any of the parties.

Some of the parties are illustrated in FIG. 1 and may be involved in the utilization of various embodiments of the present invention.

In FIG. 1, a network 10 is utilized to provide a communication or a connection between any combination or arrangement of at least one or more of a hearing impaired person ("HIP") 12, a monitor ("M") 14, a teacher ("T") 16, an interpreter ("I") 18, and/or any other third party ("O") 20. The connections are quasi connections between any of the parties 12, 14, 16, 18, 20 and the network 10 may be accomplished by any technique known in the art, for example, wireless connections, land-based connections, satellite connections, and/or any combination and the like.

More specifically as shown in FIG. 1, the HIP 12 is a utilizer of the translation or interpretation of this exemplary arrangement of the present invention and may also be, for example, a family member or other close associate of the user or any other person the user may designate. The M 14 of the network 10 is preferably utilizing this exemplary embodiment of the present invention in order to, for example, monitor, measure, rate, or otherwise provide a type of quality control, evaluation, or insurance of an appropriate level of quality or service by the interpreter. The monitor may also provide the above evaluations as described for the T 16 and/or any O 20 and even if desired for the HIP 12, if desired. In fact, a cost attribution or implementation of a business method implementation of the present invention may also include a rating or other evaluation of the hearing impaired person themselves to adjust the price based upon economic class or level, government assistance available, and/or tax credits, or may even be based upon the relative skill of the hearing impaired person and the price adjusted accordingly based upon the ability of the hearing impaired person to utilize the embodiment of the present invention in a satisfactory or efficient manner.

The T 16 is preferably utilizing this exemplary embodiment of the present invention in order to teach the hearing impaired person wherein the teacher needs that interpretation or translation in order to perform the teaching exercise with the hearing impaired person. Of course, it is understood that the teaching exercise need not be related in any way to sign language or the hearing impaired activities but instead may be any teaching situation, for example, teaching mathematics, art, or any other subject as desired by any of the parties.

The I 18 may include, without limitation, a translator and/or transliterator or any other aid or assistant or similar type of interpreter that may be utilized for any person needing such help, preferably those understood to fall under the American With Disabilities Act.

Finally, the O 20 may comprise, for example, police, hospital's administration and staff, doctors, relatives that are not at the hospital but wish to sit in on the consultation with the hearing impaired patient, and/or additional hearing impaired family members that may also wish to utilize and be aware of the communication transpiring between the hearing impaired person and any other person or entity that is connected via the network in this exemplary embodiment of the present invention.

Yet another arrangement of the present invention may include providing the interpretation on a time delay basis, for example, where the delivery of the interpretation is at a point in time substantially after the provision of the speech and/or sign language to be interpreted and translated. Thus, for example, in one exemplary embodiment a person may speak into a recording device and then at some later time, for example, 12 hours later, the recording may be transliterated and then provided as desired to the hearing impaired person at a convenient time that they request. Also, the initiator or verbal message user in this example may specify time for delivery of the translated communication. Of course, it is understood that yet another arrangement of the present invention includes a video tape or a recordation of the visual sign language by the hearing impaired person that has been transmitted through a translator and the, for example, spoken interpretation is then later delivered, for example, as a voicemail to the intended recipient. Similarly, any transcripts or recordations or the like may also be provided at a time delay and the cost of the same in the use alternate embodiments may be adjusted accordingly, if desired.

In yet other arrangements of the present invention in an exemplary embodiment a synthespian arrangement may be utilized, wherein a synthespian is a digitally generated interactive actor, avatar, agent or a digitally morphed, modified or enhanced interactive recording of a real person. Thus, for example, a hearing impaired person may utilize a network to communicate with a receiver or an interpreter or a recorder that may be later viewed by the interpreter. The interpreter may then interpret the sign language communication into the spoken language, and provide it to, for example, a third party. However, this example prior to the viewing by the interpreter of the hearing impaired person's communication via sign language, a computer generated synthespian may, for example, be utilized to mask or alter the appearance of the hearing impaired person so that the interpreter will not know the true identity of the hearing impaired person in order to better safeguard and provide a semblance of privacy for the hearing impaired person. Alternatively, in a similar fashion the interpreter may receive a spoken communication and translate it into sign language for the hearing impaired person. However, prior to viewing of the interpretation by the hearing impaired person, the visual image is passed through, for example, a computer processing unit that then converts at least a portion of the image of the interpreter into a synthespian type image. Thus, the hearing impaired person only sees an artificial or synthespian interpreter and not the actual physical look and/or identity of the interpreter so that the deaf person and/or the interpreter may be provided with a relatively secure and/or a relatively private type of communication. Thus, the hearing impaired person may later "bump" into the interpreter on the street and yet neither would recognize the other, thus, providing some semblance of privacy for the hearing impaired person and/or the interpreter and/or any other third parties.

In preferred embodiments of the instant invention, the aforementioned synthespian substitution or "masking" of the identities may be applied to the hearing impaired user, the interpreter, any third party users, such a physician using the service in an emergency room and/or any remote third party participant in the videoconference. In further preferred embodiments, the synthespian substitution or masking of identities may by performed in real time by sufficiently fast processing of digital data corresponding to the images and voices of the aforementioned parties.

Yet other alternate embodiments of the present invention include utilizing the interpretation over the network as a portion of, for example, a video dating service, wherein the translator and/or interpreter may be provided in relatively real-time to assist a hearing impaired person in a World Wide Web based dating service and the like. Similarly the various embodiments of the present invention may be utilized so as to conduct an adult video conferencing communication wherein the communication is primarily of a sexual nature. Further, a video chat room or a chat room that is provided with a video link to the hearing impaired person may utilize, for example, streaming video to enhance the communications via the interpreter at a World Wide Web chat room. Thus, the hearing impaired person may make arrangements to "meet" at a specified time on a website chat room wherein the hearing impaired person utilizes various aspects of the present invention to have the hearing impaired person's communication be translated into verbal or spoken communication and vice versa from the other parties participating in the chat room activity. This may be done either in a time delay fashion as described above that is a message to the chat room or alternatively in a relatively real-time or near real-time application in yet another embodiment of the present invention. It is particularly applicable for utilizing various embodiments of the present invention in the more recently implemented video chat rooms that may be engaged in the utilization of a network such as the World Wide Web.

In further embodiments of the instant invention, the providing of interpreting services using the system, method and apparatus disclosed herein includes the provider's, user's and/or subscriber's use of tax incentives, such as tax credits as set forth in Appendix 1 hereto, provided by one or more governmental entities for the purchase, installation, upgrading and/or maintenance of equipment and/or purchase of services and/or subscriptions for the above mentioned interpretation and/or translation services.

Appendix 1

Disability-Related Tax Provisions Applicable to Businesses Excerpted from the ADA Handbook; Appendix G, Tax Provisions The three disability-related provisions in the Internal Revenue Code applicable to businesses described below are of particular interest to businesses and people with disabilities:

1) Targeted Jobs Tax Credit (Title 26, Internal Revenue Code, section 51)
    Employers are eligible to receive a tax credit in the amount of 40 percent of the first $6,000 of first-year wages of a new employee who has a disability. There is no credit after the first year of employment. For an employer to qualify for the credit, a worker must have been employed for at least 90 days or have completed at least 120 hours of work for the employer. The Revenue Reconciliation Act of 1990, Public Law 101-508, extended this tax credit through Dec. 31, 1991.
2) Tax Deduction to Remove Architectural and Transportation Barriers to People with Disabilities and Elderly Individuals (Title 26, Internal Revenue Code, section 190)
    Allows a deduction for "qualified architectural and transportation barrier removal expenses." Only expenditures that are for the purpose of making any facility or public transportation vehicle owned or leased by the tax payer for use in connection with his or her trade or business more accessible to, and usable by, handicapped and elderly individuals are eligible for the deduction. The taxpayer must establish, to the satisfaction of the Secretary of the Treasury, that the resulting removal of the barrier meets the standards promulgated by the Secretary with the concurrence of the U.S. Architectural and Transportation Barriers Compliance Board.
    For purposes of this section, a "handicapped individual" is any individual who has a physical or mental disability (including, but not limited tot deafness and blindness) which, for that individual, constitutes or results in a functional limitation to employment, or who has any physical or mental impairment that substantially limits one or more major life activities of that individual.
    The deduction may not exceed $15,000 for any taxable year. (The maximum deduction had been $35,000 prior to passage of Public Law 101-508 in 1990, which lowered the maximum deduction.)
3) Disabled Access Tax Credit (Title 26, Internal Revenue Code, section 44)
    This tax credit is available to "eligible small businesses" in the amount of 50 percent of "eligible access expenditures" for the taxable year that exceed $250 but do not exceed $10,250.
    "Eligible small businesses" are those businesses with either:
    a) $1 million or less in gross receipts for the preceding tax year
    OR
    b) 30 or fewer full-time employees during the preceding tax year.
    "Eligible access expenditures" means amounts paid or incurred by an eligible small business for the purpose of enabling the small business to comply with applicable requirements under ADA.
    Certain types of expenditures are listed as included under the meaning of the term "eligible access expenditures." These include amounts paid or incurred:
    i) for the purpose of removing architectural, communication, physical, or transportation barriers that prevent a business from being accessible to, or usable by, individuals with disabilities;
    ii) to provide qualified readers, taped texts, and other effective methods of making visually delivered materials available to people with visual impairments;
    iii) to provide qualified interpreters or other effective methods of making aurally delivered materials available to individuals with hearing impairments;
    iv) to acquire or modify equipment, or devices for individuals with disabilities, or
    v) to provide other similar services, modifications, materials, or equipment.

Expenditures that are not necessary to accomplish the above mentioned purposes are not eligible. Expenses in connection with new construction are not eligible. "Disability" has the same meaning as it does in the ADA. Barrier removals or the provision of services, modifications, materials, or equipment must meet standards promulgated by the Secretary in order to be eligible.

The invention has been described in reference to particular embodiments as set forth above. However, only the preferred embodiment of the present invention, and but a few examples of its versatility are shown and described in the present disclosure. It is understood that the present invention is capable of use in various other combinations and environments, and is capable of changes or modifications within the scope of the inventive concept as expressed herein. Indeed, in still further embodiments, automated closed captioning can be used to deliver via a network, real-time, simultaneous language translations. Further still, electronic avatars can be utilized to provide fully mobile, wireless network interpreting and simultaneous translation services enabling business travelers and tourists to have immediately available translation services irregardless of time or location. In other embodiments, a sign language motion electronic dictionary can be utilized to enable electronic based communication with direct interface between deaf and hearing-enabled parties. Applications for such dictionary could include, but is not limited to, remote ordering devices for fast food outlets, rental car outlets, and ticket purchase outlets.

Figure 3:
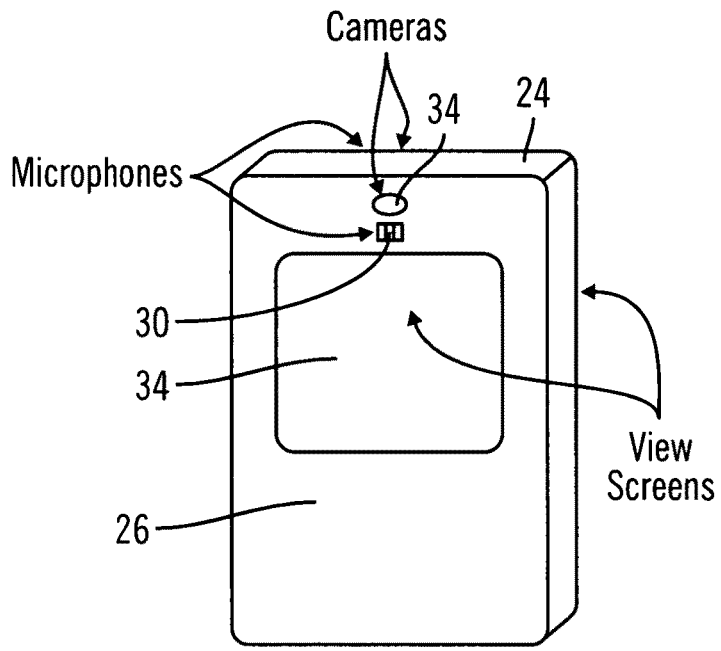
FIG. 3 depicts a preferred embodiment of a hand held two user computer device, wherein the two user computers are housed within a single housing.
Figure 4:
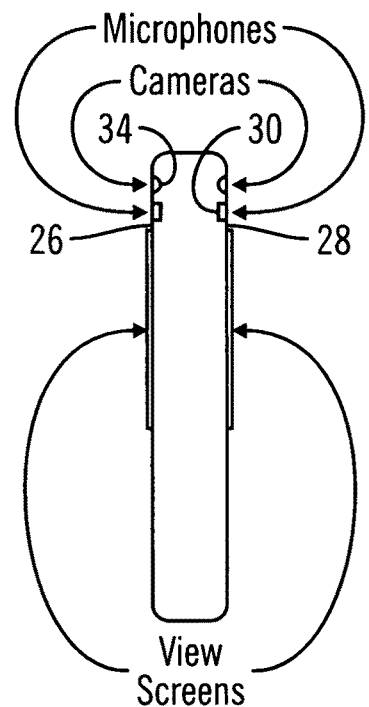
FIG. 4 depicts a side perspective of the embodiment shown in FIG. 3.
Figure 5:
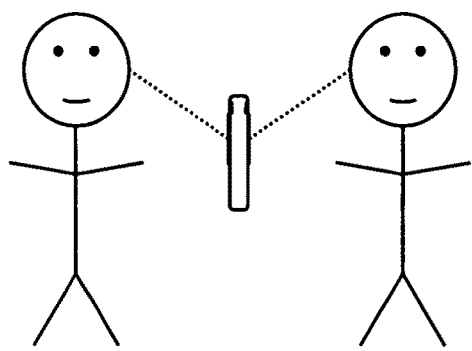
FIG. 5 depicts usage of the embodiment shown in FIG. 3 by two users.
Figure 6:
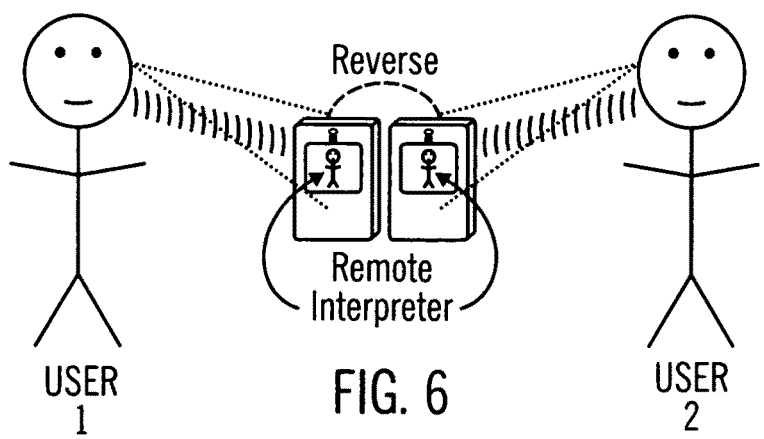
FIG. 6 depicting use of the two user computer device utilized by a two separate users each having a separate two user computer device.

In another preferred embodiment, a plurality of user computers can be contained within a single housing system. For instance, with reference to FIGS. 3 and 4, two user computers can be contained within a single housing 24 having a first side 26 and a second side 28, wherein the means for receiving and transmitting the audio and visual information for the first user computer resides on the first side of the housing 26 and the means for receiving and transmitting the audio and visual information for the second user computer resides on the second side of the housing 28. In one embodiment, the audio receiver and transmitter 30 is a microphone and the visual receiver 34 and transmitter is a camera and a screen. In this manner, and with reference to FIG. 5, a user, such as a doctor, could stand across from the hearing impaired person such that the user is viewing a visual transmitter on the first side, such as a screen and the hearing impaired person is viewing a visual transmitter on the second side, such as a screen. In this embodiment, the interpreter is transmitted simultaneously to both the doctor and the hearing impaired such that interpretation services are provided. In still other embodiments, and with reference to FIG. 6, each user could utilize a separate hand held device. It is to be understood that this description is not intended to limit the invention. Rather, the invention is intended to encompass all permutations on the invention. For instance, the embodiment in FIG. 3 could also be utilized for foreign language interpretation services such that two user parties could communicate via interpretive services provided by the hand held network device housing the two user computers.

What is claimed is:

1. A communication services system operable with a plurality of human interpreters on a computer network having a provider computer, at least one user computer, and a plurality of interpreter computers, each interpreter computer having a manual input/output device for manual operation by a respective one of the human interpreters, wherein the at least one user computer is accessible by a first user and a second user, the first user and second user requiring at least one of the human interpreters to facilitate communication with other, comprising:
   means for receiving and transmitting information between the provider computer and the at least one user computer, the information relating to a request for interpretive services; and
   means for communication on the communication network with a human interpreter on at least one of the plurality of interpreter computers via the provider computer to request interpretation services for interpreting communications between the first user and the second user;
   wherein the at least one user comprises a user computer that comprise a housing, the housing having a first side and a second side, and the user computer further comprises a first display means and a first input means for audio and visual information, the first display means and first input means residing on the first side of the housing, and a second display means separate from the first display means and a second input means for audio and visual information, the second display means and a second input means residing on the second side of the housing, and wherein the system is configured to allow the first user to access the first side of the housing of the user computer and the second user to access the second side of the housing of the user computer, to receive and transmit information between the provide provider computer and the computer.

2. A communication services system operable with a plurality of human interpreters on a computer network having a provider computer, at least one user computer, and a plurality of interpreter computers, each interpreter computer having a manual input/output device for manual operation by a respective one of the human interpreters, wherein the at least one user computer is accessible by a first user and a second user, the first user and second user requiring at least one of the human interpreters to facilitate communication with each other, comprising:
   means for receiving and transmitting information between the provider computer and the at least one user computer, the information relating to a request for interpretive services; and
   means for communication on the communication network with a human interpreter on at least one of the plurality of interpreter computers via the provider computer to request interpretation services for interpreting communications between the first user and the second user;
   wherein the at least one user computer comprises a plurality of user computers, each of the plurality of user computers having means for receiving and transmitting information between the provider computer and each other one of the plurality of user computers, wherein each of the plurality of user computers is in electronic communication with each other and with the provider computer;
   wherein the plurality of user computers comprise a first user computer and a second user computer, wherein the fast user computer and second user computer are contained within a single housing, the housing having a first side and a second side, the first user computer having a first means for manual input/output of audio and visual information, wherein the first means for manual input/output of the audio and visual information for the first user computer resides on the first side of the housing and wherein the second user computer having a second means for manual input/output of audio and visual information separate from the first means for manual input/output of audio and visual information, wherein the second means for manual input/output of the audio and visual information for the second user computer resides on the second side of the housing, and wherein the system is configured to allow the first user to access the first user computer to receive or transmit information between the provider computer and the first user computer at the same time that the second user is able to access the second user computer to receive or transmit information between the provider computer and the first user computer.

3. A communication services system as claimed in claim 1, wherein at least one of either the provider computer, the at least one user computer, or interpreter computer comprises a hand-held device.

4. A communication services system as claimed in claim 3, the at least one of either provider computer user computer, or interpreter computer being selected from the group consisting of portable telephones, personal appointment managers, a Palm Pilot, and a personal communication device.

5. A communication services system as 'claimed in claim 1, wherein at least one of the provider computer and the user computer comprises a hand-held device.

6. A communication services system as claimed in claim 5, the provider computer and user computer being selected from the group consisting of portable telephones, personal appointment managers, a Palm Pilot, and a personal communication device.

7. A communication services system as claimed in claim 2, wherein the user computers each comprise a hand-held device.

8. A communication services system operable with a plurality of interpreters on a computer network having a provider computer, and a plurality of interpreter computers, wherein the at least one interpreter to facilitate communication between a first user and a second user comprising:
  at least one user computer configured to receive and transmit information from and to the provider computer, the information relating to a request for interpretive services for interpreting communications between the first user and the second user, the at least one user computer further configured to receive interpretation services from a selected one of the interpreter computers that is selected based on the information;
  the at least one user computer comprising a housing having a first side and a second side, at least one first input device and first display device configured to allow the first user to input and output audio and visual information wherein the at least one first input device and first display device resides on the first side of the housing, at least one second input device and second display device configured to allow the second user to input and output audio and visual information wherein the at least one second input device and second display device resides on the second side of the housing;
  wherein the first and second input devise and first and second display devices are arranged on the housing to allow the first user to allow the first user to access the at least one first input device and first display device at the same time that the second user is able to access the at least one second input device and second display device.

9. A communication services system as claimed in claim 8, wherein the at least one user computer comprises a portable, hand-held device.

10. A communication services system as claimed in claim 8, wherein the at least one user computer is configured to transmit interpreter selection information to the provider computer, the information relating to criteria for selecting an appropriate interpreter for the interpretation services.

11. A communication services system as claimed in claim 8, wherein the at least one user computer is a portable, wireless network communication device that accesses the communication network from a location that is remote to the provider computer and the plurality of interpreter computers, to receive and transmit the information from and to the provider computer and to receive the interpretation services over the communication network.

12. A communication services system as claimed in claim 1, wherein the first side of the housing and the second side of the housing face mutually opposite directions.

13. A communication services system as claimed in claim 2, wherein the first side of the housing and the second side of the housing face mutually opposite directions.

14. A communication services system as claimed in claim 8, wherein the first side of the housing and the second side of the housing face mutually opposite directions.

15. A communication services system as claimed in claim 8, wherein the first input device comprises a first camera carried in the housing, and wherein the second input device comprises a second camera carried in the housing.

16. A communication services system as claimed in claim 8, wherein the first input device comprises a first camera held by the housing and directed to input visual information from the first side of the housing, and wherein the second input device comprises a second camera held by the housing and directed input visual information from the second side of the housing.

17. A communication services system as claimed in claim 8, wherein the first input device comprises a first microphone held by the housing and directed to input audio information from the first side of the housing, and wherein the second input device comprises a second microphone held by the housing and directed to input audio information from the second side of the housing.

18. A communication service device operable with a communication network, comprising:
  at least one user communication device configured to receive and transmit information over the communication network;
  the at least one user communication device comprising a housing having a first side and a second side, at least one first input device and first display device configured to allow the at least one user to input and output visual information wherein the at least one first input device and first display device resides on the first side of the housing, at least one second input device configured to input visual information wherein the at least one second input device resides on the second side of the housing;
  wherein the first and second input devices and first display devices are carried by the housing in an orientation to allow the at least one user to access the at least one first input device and first display device from the first side of the housing at the same time as the at least one second input device from the second side of the housing.

19. The communication service device as claimed in claim 18, wherein the first side of the housing and the second side of the housing face mutually opposite directions.

20. The communication services device as claimed in claim 18, wherein the first input device comprises a first camera, and where the second input device comprises a second camera.

21. The communication services device as claimed in claim 19 includes, a second display device residing on the second side of the housing.

* * * * *